United States Patent [19]

Little

[11] Patent Number: 5,303,390

[45] Date of Patent: Apr. 12, 1994

[54] MICROPROCESSOR AUXILIARY WITH COMBINED PIN FOR RESET OUTPUT AND PUSHBUTTON INPUT

[75] Inventor: Wendell L. Little, Denton, Tex.

[73] Assignee: Dallas Semiconductor Corporation, Dallas, Tex.

[21] Appl. No.: 546,213

[22] Filed: Jun. 28, 1990

[51] Int. Cl.⁵ .......................................... G06F 11/00
[52] U.S. Cl. ..................................................... 395/575
[58] Field of Search .................. 364/200, 230.4, 264, 364/264.7, 267.9, 273.4; 371/12; 307/296.4; 361/88, 93

[56] References Cited

U.S. PATENT DOCUMENTS

| 4,125,788 | 11/1978 | Kohman | 307/255 |
|---|---|---|---|
| 4,305,106 | 12/1981 | Bergman | 307/296.4 |
| 4,317,181 | 2/1982 | Teza et al. | 364/707 |
| 4,342,065 | 7/1982 | Larson | 361/93 |
| 4,404,972 | 9/1983 | Gordon et al. | 364/200 |
| 4,409,665 | 10/1983 | Tubbs | 364/707 |
| 4,461,003 | 7/1984 | Tamaki | 371/66 |
| 4,568,179 | 4/1986 | Sirazi et al. | 371/12 |
| 4,591,782 | 5/1986 | Germer | 324/103 R |
| 4,615,005 | 9/1986 | Maejima et al. | 364/200 |
| 4,627,022 | 12/1986 | Mensink et al. | 364/900 |
| 4,658,352 | 4/1987 | Nagasawa | 364/200 |
| 4,698,748 | 10/1987 | Juzswik et al. | 364/200 |
| 4,742,482 | 5/1988 | Inskeep et al. | 364/900 |
| 4,766,567 | 8/1988 | Kato | 364/900 |
| 4,768,147 | 8/1988 | Lamiaux | 364/200 |
| 4,809,280 | 2/1989 | Shonaka | 371/62 |
| 4,851,987 | 7/1989 | Day | 364/200 |
| 4,860,154 | 8/1989 | Fazlollahi | 361/93 |

FOREIGN PATENT DOCUMENTS 0077845 4/1983 European Pat. Off. .
55-66763 5/1980 Japan .

OTHER PUBLICATIONS

Allen, "Analog Supervisor Chip Keeps Microprocessor Out of Trouble," Electronic Design, Apr. 30, 1987.
Kroeger, "Peripheral i.c.s take the burden off micros," 13 New Electronics 71 (1980).

Primary Examiner—Robert W. Beausoliel, Jr.
Assistant Examiner—Allen Lo
Attorney, Agent, or Firm—Worsham, Forsythe, Sampels & Wooldridge

[57] ABSTRACT

A system which includes not only a microprocessor (or microcontroller), but also an auxiliary chip which monitors the system power supply voltage and performs related functions for the microprocessor, and also provides a watchdog function to monitor the microprocessor's activity. The auxiliary chip uses only two pins for the three functions of:
  active-high-reset out,
  active-low-reset out, and
  pushbutton reset input.

9 Claims, 7 Drawing Sheets

*FIG. 1*
FUNCTIONAL BLOCK DIAGRAM

*FIG. 2*
ST\ INPUT TIMING

FIG. 3
POWER MONITOR, WATCHDOG TIMER, AND PUSHBUTTON RESET

FIG. 4
PUSH BUTTON RESET TIMING

FIG. 5
NONMASKABLE INTERRUPT

FIG. 6
NMI\ FROM IN INPUT

FIG. 7
NONVOLATILE SRAM

FIG. 8
FRESHNESS SEAL

FIG. 9
POWER SWITCHING

FIG. 10
POWER DOWN TIMING

FIG. 12
RST PUSH BUTTON MONITOR

FIG. 13
INTERNAL WATCHDOG TIMEOUT
RST PULSE

FIG. 14
EXTERNAL PUSH BUTTON ACTIVATED RST PULSE

FIG. 15
RST PUSH BUTTON MONITOR WITH DEBOUNCE

MICROPROCESSOR AUXILIARY WITH COMBINED PIN FOR RESET OUTPUT AND PUSHBUTTON INPUT

PARTIAL WAIVER OF COPYRIGHT

All of the material in this patent application is subject to copyright protection under the copyright laws of the United States and of other countries. As of the first effective filling date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

CROSS-REFERENCE TO RELATED APPLICATIONS

The present application is a continuation-in-part application, claiming priority from the following commonly-owned applications, which are all hereby incorporated by reference:

Pending U.S. application Ser. No. 283,268, Filed Dec. 9, 1988, entitled POWER-UP RESET CONDITIONED ON DIRECTION OF VOLTAGE CHANGE;

Pending U.S. application Ser. No. 282,793, Filed Dec. 9, 1988, entitled SLEEP COMMAND CONDITIONED BY TIMING WINDOW DERIVED FROM STROBE PIN;

Pending U.S. application Ser. No. 283,267, Filed Dec. 9, 1988, entitled MICROPROCESSOR AUXILIARY WITH ABILITY TO BE QUERIED RE POWER HISTORY;

Pending PCT Application PCT/US 89/05456, Filed Nov. 30, 1989 (including the US as a designated country), entitled AUXILIARY INTEGRATED CIRCUIT FOR MICROPROCESSOR MANAGEMENT; and Pending PCT Application PCT/US 89/05544, Filed Dec. 30, 1989 (including the US as a designated country), entitled BATTERY-INITIATED TOUCH-SENSITIVE POWER-UP.

BACKGROUND AND SUMMARY OF THE INVENTION

The present invention relates to microprocessor auxiliary circuits, and to systems which include an auxiliary circuit in combination with a complex integrated circuit.

Microprocessor Auxiliary Circuits

The Dec. 9, 1988 parent applications described (among other innovations) a type of system which included not only a microprocessor (or microcontroller), but also an auxiliary chip which provides some important monitoring and overhead functions for the microprocessor. For example, in the primary embodiments described there, the auxiliary chip monitors the system power supply voltage and performs related functions for the microprocessor, and also provides a watchdog function to monitor the microprocessor's activity. The primary auxiliary chip embodiment, as described in these applications, is generally similar to the integrated circuit now sold as part number DS1236. (This integrated circuit and its data sheet are available from Dallas Semiconductor Corporation, 4350 Beltwood Parkway, Dallas TX 75244, and are both hereby incorporated by reference.)

A variety of microprocessor auxiliary chips, with various functionalities, have now been proposed. For example, Dallas Semiconductor also sells a DS1227 chip, which has significantly different functions from the DS1236 chip, and is especially well adapted to systems under stringent power constraints. (This integrated circuit and its data sheet are available from Dallas Semiconductor Corporation, 4350 Beltwood Parkway, Dallas TX 75244, and are both hereby incorporated by reference.)

For another example, Maxim sells auxiliary chips (including at least a "MAX690" chip and a "MAX691" chip) which are also intended for microprocessor supervision. Allen, "Analog supervisor chip keeps microprocessor out of trouble."35 Electronic Design, pages 104–108 Apr. 30, 1987) supposedly contains disclosure as follows (according to the abstract in the INSPEC on-line database): "The goal at Maxim Integrated Products was to sharply reduce the complexity, component count, and space of standard microporcessor supervisory circuits, while improving the accuracy and reliablility of reset and battery-switchover circuits together with a watchdog timer and write protection. The result was the MAX691 and MAX690 micrprocessor supervisory ICs which pack many common housekeeping functions into 16-pin and 8-pin packages." Also, Schwerte, "An analogue supervisory circuit for microcomputers" [in German], 18 Electron. Ind. (West Germany) no. 6, pages 66, 68–70 (1987) supposedly contains disclosure as follows (according to the abstract in the INSPEC on-line database): "The author describes the Maxim MAX691 supervisory chip. It comprises all the necessary functions for the secure operation of a microprocessor system. The design aims for this unit was the improved resolution and reliability of the back-up circuit, and the circuitry for switching between the normal power supply and the battery supply, as well as the realization of such necessary functions as the watchdog timer and the write protection for EEPROMs and CMOS-RAMs." Both of these articles are hereby incorporated by reference.

For another example, Dallas Semiconductor has recently announced a DS1239 chip, which is generally similar to the primary described auxiliary chip embodiment in the Nov. 30, 1989 PCT application. This chip provides additional power management functions, in addition to those of the DS1236 embodiment. (This integrated circuit and its data sheet are available from Dallas Semiconductor Corporation, 4350 Beltwood Parkway, Dallas Tex. 75244, and are both hereby incorporated by reference.)

Active-High and Active-Low Resets

A microprocessor auxiliary chip should be able to reset the attached microprocessor. The "reset" input to a microprocessor forces the microprocessor into a known state-either immediately, or after a certain number of clock cycles have passed. Thus, a reset input can be used ot rescue the microprocessor from any kind of stuck state. Substantially all microprocessors have some kind of reset input. However, different microprocessors require different kinds of reset signals. For example, the Intel 8051 microprocessor requires an active-high reset, and the Motorola 6800 microprocessor requires an active-low reset. That is an active-high reset microprocessor has an RST (not RST \ pin, and the microprocessor will go into reset if the RST pin is driven to a high logic level. An active-low microprocessor has an RST \ pin, and will go into reset if the RST \ pin is driven low.

An advantageous way to deal with this is to provide two reset signal outputs from an auxiliary chip, one active-high (RST) and one active-low (RST \). Thus, the user can wire up the auxiliary chip to match the microprocessor specified for use in his system. However, note that this flexibility in the auxiliary chip requires that two pins, rather than one, be available for the reset signals. (Thus, this functionality has heretofore imposed an added constraint on packaging, which is undesirable.)

Use of Pushbutton to Provide Inputs to Integrated Circuit Logic

In many system configurations, it is helpful if the user can provide a direct input into logic circuits, for example by pushing a button. This capability can provide a very simple and reliable input, which can be used to reliably force a complex logic system into reset. (If a complex programmable logic system hangs up, it may not be possible to interrupt it with the normal inputs, such as keyboard input.)

A pushbutton input must be "debounced." As a mechanical contact actually closes, the voltage across the contacts may go from high to low repeatedly, before stabilizing. This may be due, for example, to physical bouncing of the contacts, or to native oxide on the contacts. An over-sensitive circuit could sense this as several separate actuations. Simple circuits can be used for debouncing, but the need for debouncing circuits limits the other functions of a pushbutton input. Thus, again, this desirable feature places a burden on pinout.

Innovative Microprocessor Auxiliary

Among the innovations disclosed in the present application is a new microprocessor auxiliary chip, in which two pins are used for the three functions of active-high-reset out, active-low-reset out, and pushbutton input. (This chip embodiment will be referred to herein as the "DS1238"; however, it should be noted that the actual DS1238 chip, when it comes to market, may not necessarily correspond to this embodiment in all details.)

In this embodiment, the pushbutton input is combined with an active-low reset output pin. This pin functions to provide both an output RST \ function for such elements as the watchdog timer or power fail, while also providing a monitor of the state of an external push button tied between the RST \ pin and ground (see FIG. 3). This combination allows the use of an external push button for a RST \ function without the need to dedicate a pin on the chip to the push button.

The push button monitor is achieved through the monitoring of the drivers which drive the final output devices on the RST \ pin. If these drivers indicate that the internal circuits on the DS1238 are not attempting to generate a low on the RST \ pin, the monitor circuit assumes that the external push button has pulled the RST \ pin low. This circuit in turn will force the internal DS1238 circuits to complement the low on the RST \ pin (using pin drivers) for an average of approximately 100 ms. In this manner a less than 100 ms pulse on the push button will translate into a 100 ms pulse on the RST \ pin. In short the DS1238 will guaranty that the RST \ pin is always pulsed low for an average of 100 ms, whether the reset is initiated by a watchdog timeout, by detection of power failure, or by actuation of the external push button. The RST \ pin drivers are composed of a strong n-channel pull down and a very weak p-channel pull up, to allow for a wired-OR RST \ function. Since the internal functions which produce a RST \ are clock sampled, the monitor circuit is sampled with an inverse clock to provide a means of testing the drivers of the output RST \ pin drivers without encountering race condition problems. The enclosed block diagram should give you the basics. This function would also work in general for the RST pin (active high wired OR), as well the NMI \ output pin.

BRIEF DESCRIPTION OF THE DRAWING

The present invention will be described with reference to the accompanying drawings, which show important sample embodiments of the invention and which are incorporated in the specification hereof by reference, wherein:

FIGS. 10 and 11 are timing diagrams: FIG. 10 illustrates timing relationships for power down, and FIG. 11 shows the power up sequence.

FIGS. 13 and 14 are timing diagrams, referencing the labelled nodes of the circuit of FIG. 12: FIG. 13 illustrates timing relationships when a watchdog timeout generates a reset, and FIG. 14 illustrates timing relationships when a pushbutton input generates a reset.

DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Overall Description

Figure 1:
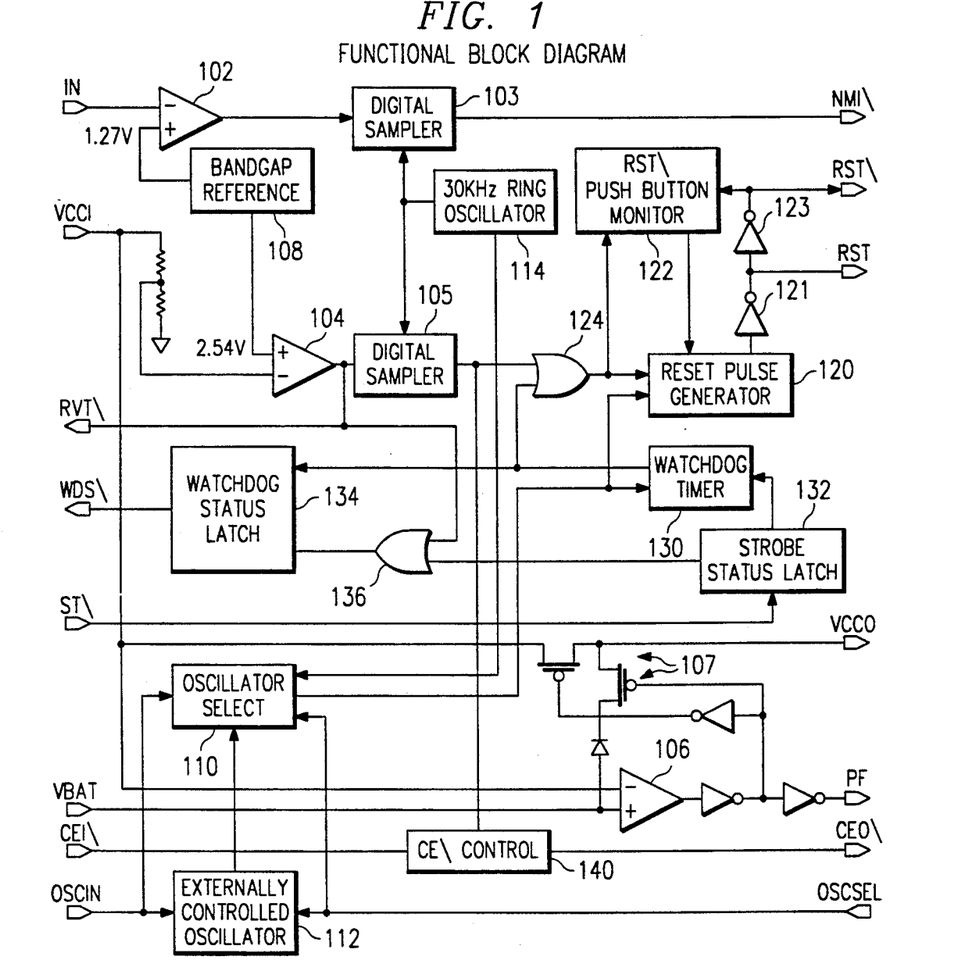
FIG. 1 shows a block diagram of the auxiliary chip of the presently preferred embodiment.

The DS1238 Micro Manager provides all the necessary functions for power supply monitoring, reset control, and memory back-up in microprocessor based systems. A precise internal voltage reference and comparator circuit monitor power supply status. When an out-of-tolerance condition occurs, the microprocessor reset and power fail outputs are forced active, and static RAM control unconditionally write protects external memory. The DS1238 also provides early warning detection of a user defined threshold by driving a non-maskable interrupt. External reset control is provided by a push-button reset debounce circuit connected to the RST \ pin. An internal Watchdog Timer can also force the reset outputs to the active state if the strobe input is not driven low prior to Watchdog time out. Oscillator control pins OSCSEL and OSCIN provide either external or internal clock timing for both the reset pulse width and the watchdog timeout period. The Watchdog Status and Reset Voltage Threshold are provided via WDS\ and RVT\ respectively. A block diagram of the DS1238 is shown in FIG. 1.

Distinguishing Features

Some of the notable features of the auxiliary chip of the presently preferred embodiment include the following. This chip embodiment: Holds a microprocessor in check during power transients; Halts and restarts an out-of-control microprocessor; Warns microprocessor of an impending power failure; Converts CMOS SRAM into nonvolatile memory; Unconditionally write protects memory when power supply is out of tolerance; Delays write protection until completion of the current memory cycle; Consumes less than 100 nA of battery current; Controls external power switch for high current applications; Debounces push button Reset; Accurate 10% power supply monitoring; Optional 5% power supply monitoring; Provides orderly shutdown in microprocessor applications; and is pin for pin compatible with MAX691.

Pin Description

The pin assignments and names used, in the presently preferred embodiment, are as follows. These signal names will be referred to in the accompanying description and drawings; but of course other signal names and/or different pinouts could be used instead.

Figure 9:
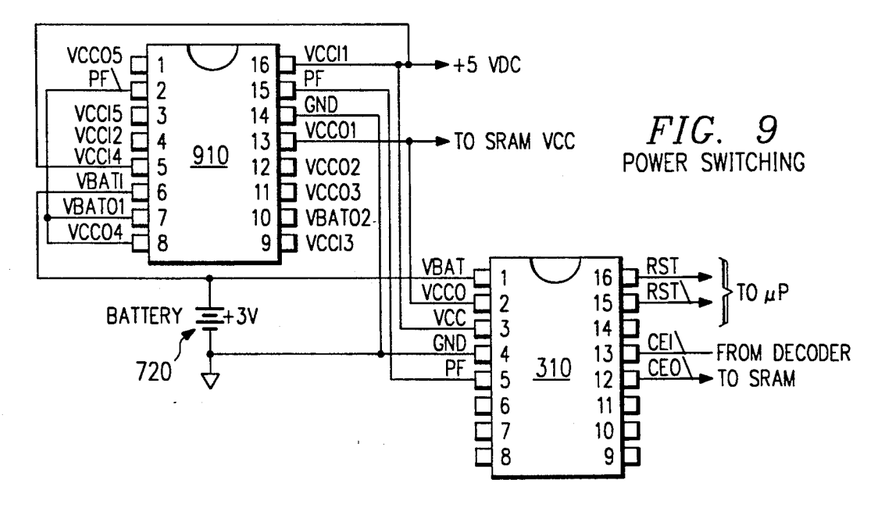
FIG. 9 shows how the active-high power-fail indicator signal PF is used for external power switching.

| Pin Name | Description |
| --- | --- |
| VBAT | +3V Battery Input provides non-volatile operation of control functions. |
| VCCO | VCC output for non-volatile SRAM applications. |
| VCC | +5V primary power input |
| GND | System ground |
| PF | Power fail indicator, active high, used for external power switching as shown in FIG. 9. |
| RVT\ | Reset Voltage Threshold. Indicates that VCC is below the reset voltage threshold. |
| OSCIN | Oscillator input or timing capacitor. |
| OSCSEL | Oscillator Select. Selects internal or external clock functions. |
| IN | Early warning power fail input. This voltage sense point may be tied (via resistor divider) to a user selected voltage. |
| NMI\ | Non-maskable interrupt. Output used in conjunction with the IN pin to indicate an impending power failure. |
| ST\ | Strobe input. A high to low transition will reset the Watchdog timer, indicating that software is still in control. |
| CEO\ | Chip enable output. Write protected. Used with non-volatile SRAM applications. |
| CEI\ | Chip enable input. |
| WDS\ | Watchdog Status. Indicates that a watchdog timeout has occurred. |
| RST\ | Active low reset output. |
| RST | Active high reset output. |

Power Monitor

The DS1238 employs a band gap voltage reference and a precision comparator to monitor the 5 volt supply (VCC) in microprocessor based systems. When an out-of-tolerance condition occurs, the RVT\, RST, and RST \ outputs are driven to the active state. The VCC trip point (VCCTP) is set for 10% operation so that the RVT\, RST and RST \ outputs will become active as VCC falls below 4.5 volts (4.37 typical). The VCCTP for the 5% operation option (DS1238-5) is set for 4.75 volts (4.62 typical). The RST and RST \ signals are excellent for microprocessor reset control, as processing is stopped at the last possible moment of in-tolerance VCC. On power up, RVT \ will become inactive as soon as VCC rises above VCCTP. However, the RST and RST \ signals remain active for a minimum of 25 msec (100 msec typical) after VCCTP is reached to allow the power supply and microprocessor to stabilize.

Watchdog Timer

Figure 2:
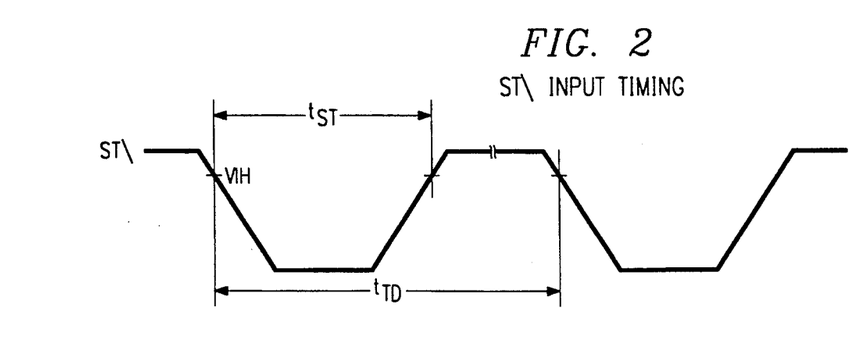
FIG. 2 shows the input timing of the ST \ strobe signal.

The DS1238 provides a Watchdog timer function which forces the WDS\, RST, and RST \ signals to the active state when the strobe input (ST \) is not stimulated for a predetermined time period. The Watchdog timeout period begins as soon as RST and RST \ are inactive. If a high-to-low transition occurs at the ST \ input prior to time-out, the Watchdog timer is reset and begins to time out again. The ST \ input timing is shown in FIG. 2. In order to guarantee that the Watchdog timer does not time-out, a high-to-low transition on ST\ must occur at or less than the minimum timeout of the Watchdog as described in the AC electrical Characteristics. If the Watchdog timer is allowed to time out, the WDS\, RST, and RST \ outputs are driven to the active state. WDS \ is a latched signal which indicates the Watchdog Status, and is activated as soon as the Watchdog Timer completes a full period. The WDS \ pin wil remain low until one of three operations occur. The first is to strobe the ST \ pin with a falling edge, which will set the WDS \ as well as the Watchdog Timer count. The second is to leave the ST \ pin open which disables the Watchdog. Lastly the WDS \ pin is set whenever VCC falls below VCCTP and activates the RVT \ signal. The ST \ input can be derived from microprocessor address, data, or control signals, as well as microcontroller port pins. Under normal operating conditions, these signals would routinely reset the Watchdog timer prior to time out. The Watchdog is disabled by leaving the ST \ input open, or as soon as VCC falls to VCCTP.

Non-Maskable Interrupt

The DS1238 generates a non-maskable interrupt NMI \ for early warning of a power failure to the microprocessor. A precision comparator monitors the voltage level at the IN pin relative to an on-chip reference generated by an internal band gap. The IN pin is a high impedance input allowing for a user defined sense point. An external resistor voltage divider network (FIG. 5) is used to interface with high voltage signals. This sense point may be derived from the regulated 5 volt supply, or from a higher DC voltage level closer to the main system power input. Since the IN trip point VTP is 1.27 volts, the proper values for R1 and R2 can readily be determined by straightforward scaling. Proper operation of the DS1238 requires that the voltage at the IN pin be limited to VIH. Therefore, the maximum allowable voltage at the supply being monitored (VMAX) can similarly be derived. A simple approach to solving this equation is to select a value for R2 of high enough value to keep power consumption low, and solve for R1. The flexibility of the IN input pin allows for detection of power loss at the earliest point in a power supply system, maximizing the amount of time for microprocessor shut-down between NMI \ and RST or RST \.

When the supply being monitored decays to the voltage sense point, the DS1238 will force the NMI \ output to an active state. Noise is removed from the NMI \ power fail detection circuitry using built in time domain hysteresis. That is, the monitored supply is sampled periodically at a rate determined by an internal ring oscillator running at approximately 30 KHz (33 μsec/cycle). Three consecutive samplings of out-of-tolerance supply (below VSENSE) must occur at the IN pin to active NMI \. Therefore, the supply must be below the voltage sense point for approximately 100 μsec or the comparator will reset. In this way, power supply noise is removed from the monitoring function preventing false trips. During a power up, any IN pin levels below VTP detected by the comparator are disabled from reaching the NMI \ pin until VCC rises to VCCTP. As a result, any potential active NMI \ will not be initiated until VCC reaches VCCTP.

Removal of an active low level on the NMI \ pin is controlled by the subsequent rise of the IN pin above VTP. The initiation and removal of the NMI \ signal during power up depends on the relative voltage relationship between VCC and the IN pin voltage. Note that a fast slewing power supply may cause the NMI \ to be virtually non-existent on power up. This is of no consequence however, since a RST will be active. The NMI \ voltage will follow VCC down until VCC decays to VBAT. Once VCC decays to VBAT, the NMI \ pin will enter a tristate mode.

Memory Backup

Figure 7:
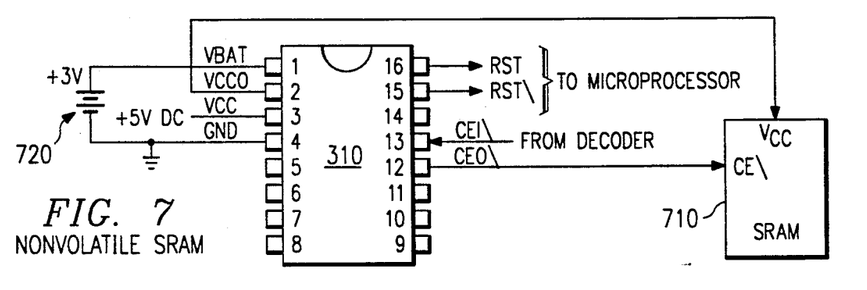
FIG. 7 shows a typical nonvolatile SRAM application.

The DS1238 provides all of the necessary functions required to battery back up a static RAM. First, an internal switch is provided to supply SRAM power from the primary 5 volt supply (VCC) or from an external battery (VBAT), whichever is greater. Second, the same power fail detection described in the power monitor section is used to hold the chip enable output (CEO \) to within 0.3 volts of VCC or to within 0.7 volts of VBAT. The output voltage diode drop from VBAT (0.7 V) is necessary to prevent charging of the battery in violation of UL standards. Write protection occurs as VCC falls below VCCTP as specified. If CEI \ is low at the time power fail detection occurs, CEO \ is held in its present state until CEI \ is returned high, or the period tCE expires. This delay of write protection until the current memory cycle is completed prevents the corruption of data. If CEO \ is in an inactive state at the time of VCC fail detection, CEO \ will be unconditionally disabled within tCF. During nominal supply conditions CEO \ will follow CEI with a maximum propagation delay of 20 nsec. FIG. 7 shows a typical nonvolatile SRAM application.

Figure 8:
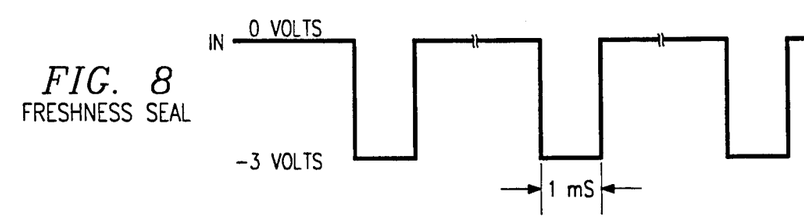
FIG. 8 shows how pulses below ground on the IN pin will invoke the freshness seal.

In order to conserve battery capacity during storage and/or shipment of an end system, the DS1238 provides an internal freshness seal to electrically disconnect the battery. FIG. 8 depicts the three pulses below ground on the IN pin required to invoke the freshness seal. The freshness seal will result in the tristate of outputs VCCO, RST, RST \, and CEO \. The PF pin is not disabled by the freshness mode and will continue to source power from the VBAT pin whenever VCC is below VBAT. The freshness seal will be disconnected and normal operation will begin when VCC is cycled and reapplied to a level above VBAT. The DS1238 may include sleep control logic, connected to selectably place the DS1238 into a sleep mode by disabling multiple circuits thereof, including the watchdog timer circuit.

Power Switching

When larger operating currents are required in a battery backed system, the internal switching devices of the DS1238 may be too small to support the required load through VCCO with a reasonable voltage drop. For these applications, the PF output is provided to gate external power switching devices. For example, in the configuration shown in FIG. 9, power to the load is switched from VCC to battery on power down, and from battery to VCC on power up. The illustrated DS1336 is an integrated circuit with low-impedance power switches. (This circuit does not have the current-handling capability of so-called power MOSFETs, but simply derives the maximum current-handling capability from standard integrated circuit processing.) In the configuration shown, the DS1336 uses the PF output to switch between VBAT and VCC. It provides better leakage and switchover performance than currently available discrete components. The transition threshold for PF is set to the external battery voltage VBAT, allowing a smooth transition between sources. Any load applied to the PF pin by an external switch will be supplied by the battery. Therefore, if a discrete switch is used, this load should be taken into consideration when sizing the battery.

Block Diagram of Preferred Auxiliary Chip Embodiment

Figure 5:
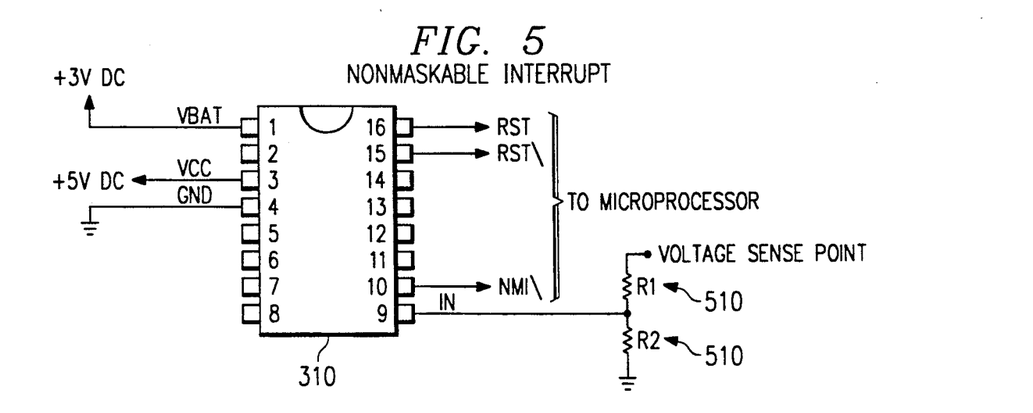
FIG. 5 shows how an external resistor voltage divider network is used to interface with high voltage signals.
Figure 6:
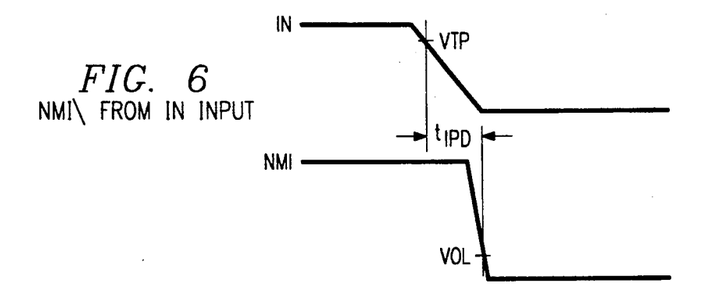
FIG. 6 is a schematic timing diagram showing how signal NMI \ relates to the trip point voltage VTP on the input line IN, in the auxiliary integrated circuit as in the presently preferred embodiment.

FIG. 1 shows a block diagram of the auxiliary chip of the presently preferred embodiment. A bandgap-voltage-reference generating circuit 108 provides voltage outputs (of 1.27 and 2.54 V, in this sample embodiment) which are relatively immune to variations in temperature and supply voltage. A comparator 102 uses the reference voltage to monitor line IN. Line IN may, for example, be connected to a power supply before the filter capacitors, to provide early warning of incipient power failure. As shown in FIG. 5, a resistive dividing network 510 determines what voltage at the power supply will be low enough to trip the comparator 102. The output of comparator 102, gated by a digital sampling circuit 103, provides the non-maskable interrupt signal NMI\, which provides an "early warning" interrupt to the microprocessor. The microprocessor can use this early warning to perfrom state save or other procedures for orderly shutdown.

Another comparator 104 is also connected to the bandgap reference 108, and monitors the system power supply VCCI. This comparator too is connected through a digital sampling gate 105. When comparator 104 detects that VCCI is below limits, the output will appear directly as a logic level on pin RVT\. In this case, the output of comparator 104 will also set the Watchdog Status Latch 134 (which drives output pin WDS \). Moreover, as soon as the sampling gate 105 passes the changed logic state of the output of comparator 104, the Reset Pulse Generator 120 will be triggered (through OR gate 124).

Note that the output from sampling gate 105 is also connected to switch the chip-enable control logic 140. This prevents CE \ signals from being passed through to nonvolatized memory when the power supply is low.

The Watchdog Timer Circuit 130 monitors the ST \ pin (through latch 132), and (through OR gate 124) commands Reset Pulse Generator 120 to issue a reset pulse if the ST \ pin remains inactive for more than a predetermined time. (The circuitry shown in Strobe Status Latch 132 also detects an open condition on pin ST \.) When Watchdog Timer Circuit 130 times out, it will set latch 134, to drive output signal WDS \ active.

The Oscillator Select Logic 110 provides a clock output which is selected from externally controlled oscillator 112 (driven or loaded by signal OSCIN) and an on-chip ring oscillator 114. (This oscillator will run at about 30 kHz at room temperature, in the presently preferred embodiment, but of course this frequency is not precisely predetermined.)

The Reset Pulse Generator 120 generates reset signals (when needed) on lines RST and RST \, with the minimum pulse width described above. The Reset/-Pushbutton Monitor 122 is connected to the logic input to the generator 120. The monitor 122 mirrors the logical relation of generator 120 and its following buffers, so that monitor 122 will not detect a pushbutton input if the RST \ line was already being driven low by pulse generator 120. However, if the monitor 122 (which includes a very weak pullup) detects that the line RST \ is being pulled low, at a time when it is not being driven low due to the state of the pulse generator logic, the monitor 122 will command the generator 120 to initiate a reset.

A third comparator 106 compares the battery voltage VBAT with the system power supply voltage VCCI, and controls large PMOS switching transistors 107 to connect output VCCO to either VCCI or (through diode isolation) to VBAT, depending on the state of VCCI. In addition, this comparator provides a logic output PF which can be used to warn other chips, or to switch discrete devices off-chip.

Timing Diagrams

Figure 10:
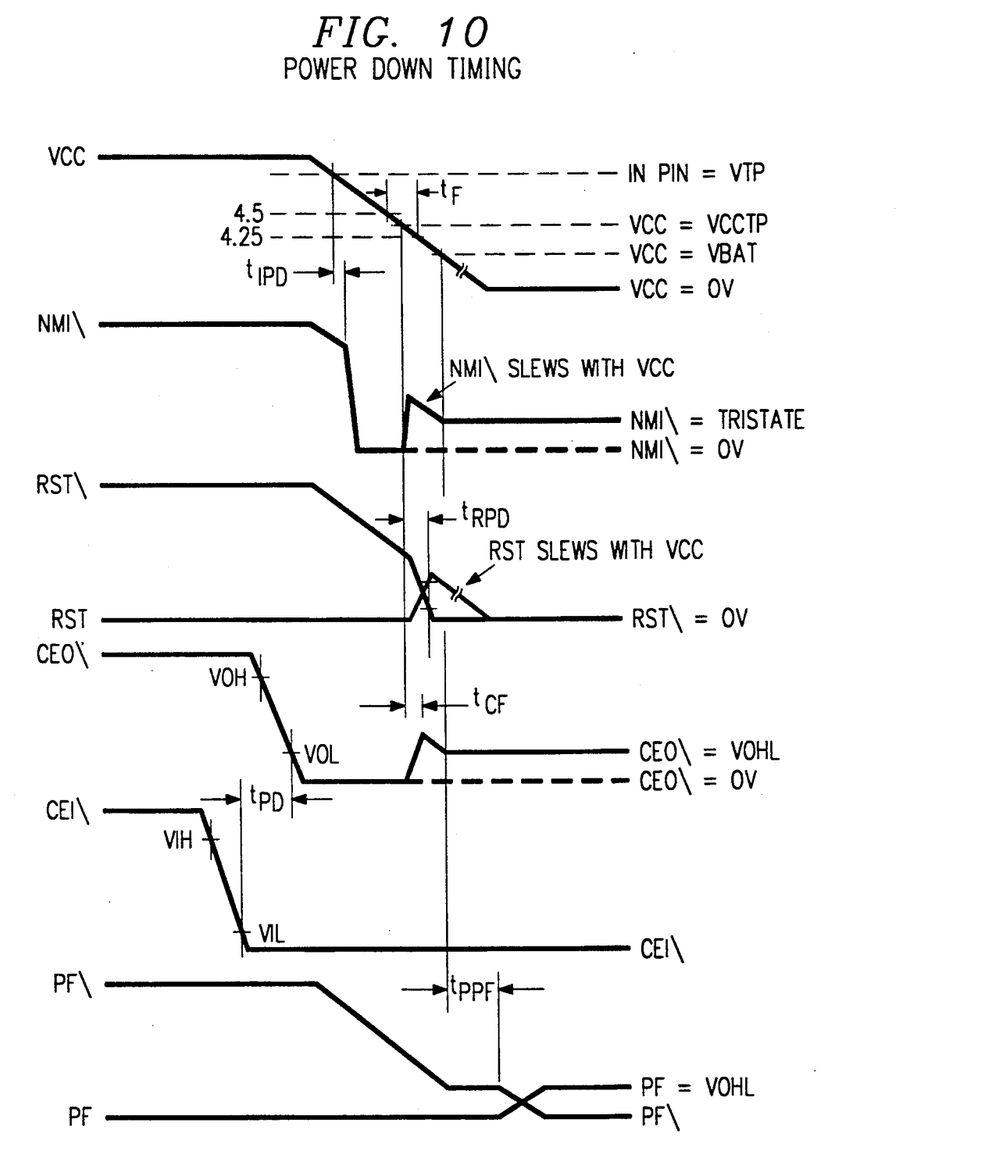
Figure 11:
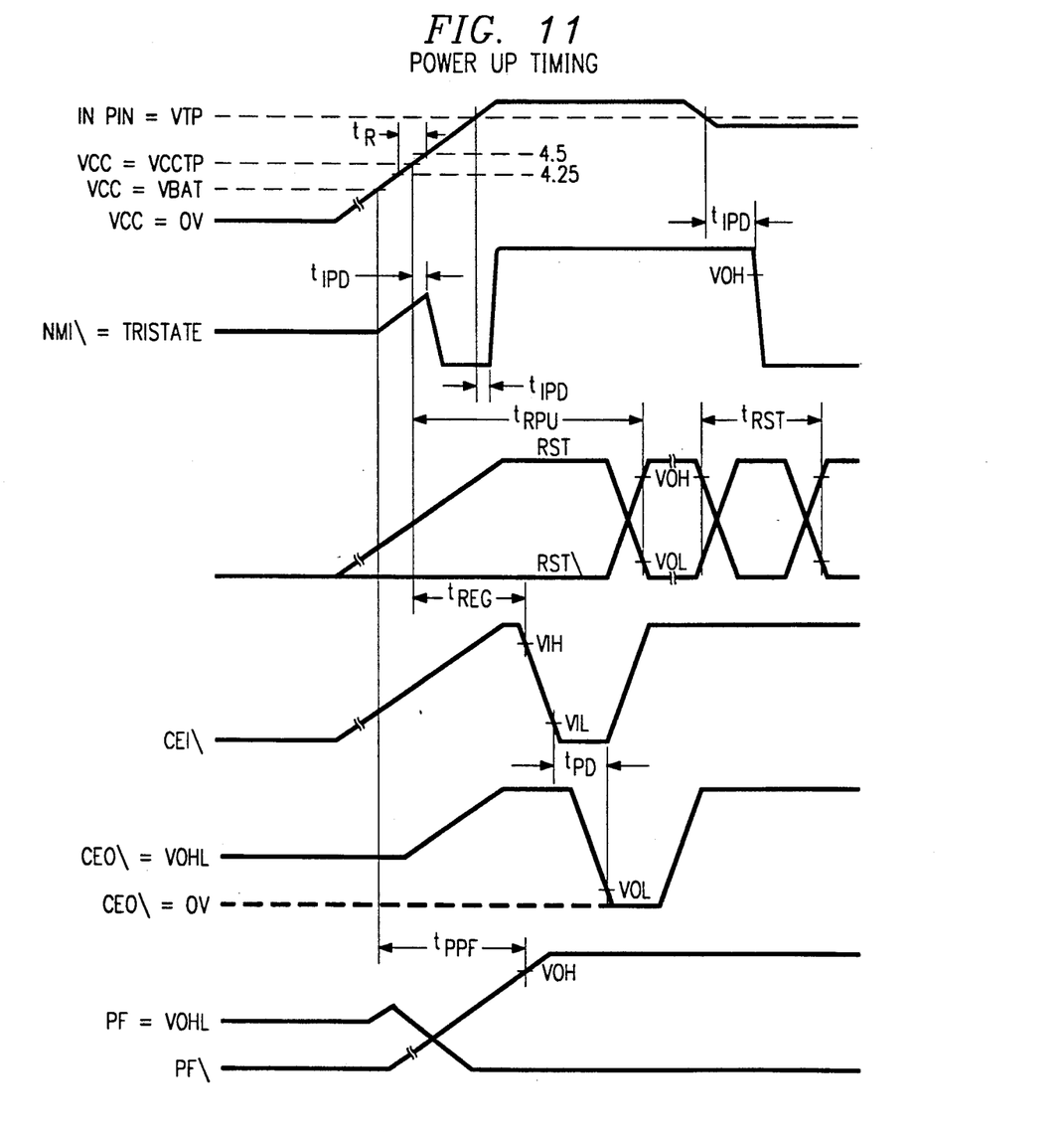

This section provides a description of the timing diagrams shown in FIGS. 10 and 11. FIG. 10 illustrates the relationship for power down. As VCC falls, the IN pin voltage drops below VTP. As a result, the processor is notified of an impending power failure via an active NMI\. This gives the processor time to save critical data in non-volatile SRAM. As the power falls further, VCC crosses VCCTP, the power monitor trip point. When VCC reaches VCCTP, and active RST and RST \ are given. At this time, CEO \ is brought high to write protect the RAM. When the VCC reaches VBAT, a power fail is issued via the PF pin.

FIG. 11 shows the power up sequence. As VCC slews above VBAT, the PF pin is deactivated. An active reset occurs as well as an NMI \. Although the NMI \ may be short due to slew rates, reset will be maintained for the standard tRPU timeout period. At a later time, if the IN pin falls below VTP, a new NMI \ will occur. If the processor does not issue an ST \, a Watchdog reset will also occur. The second NMI \ and RST are provided to illustrate these possibilities.

Specific Preferred Circuit Implementation of Pushbutton Monitor

Figure 12:
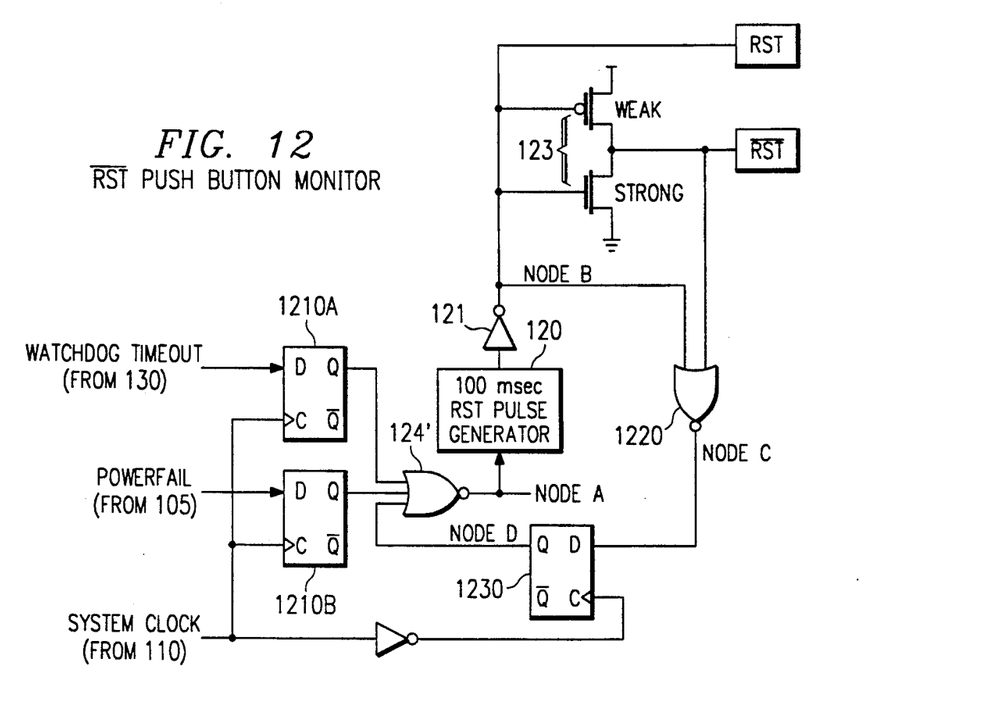
FIG. 12 is a schematic circuit diagram of the circuitry used, in the auxiliary integrated circuit of the presently preferred embodiment, to generate reset pulses and monitor pushbutton inputs.

FIG. 12 is a schematic circuit of the presently preferred embodiment, to generate reset pulses and monitor pushbutton inputs. This circuitry generally corresponds to that shown as elements 120-123 in FIG. 1, but the detailed implementation is slightly different.

A three-input NOR gate 124' is fed by three clocked latches 1210A, 1210B, and 1230. Latches 1210A and 1210B clock in signals which can indicate a reset (because of power failure, or because of watchdog timeout).

NOR gate 1220 will drive node C high if and only if the RST \ pin has been pulled low other than by inverter 123. (Note that inverter 123 has a weak PMOS pullup.) This high level, clocked through 1230, will pull node A low, to active the pulse generator 120. Similarly, a high level clocked through 1210A or 1210B will initiate a reset pulse. While a reset pulse is active, node B will remain high, and node C will remain low.

Operation of This Circuit

Figure 13:
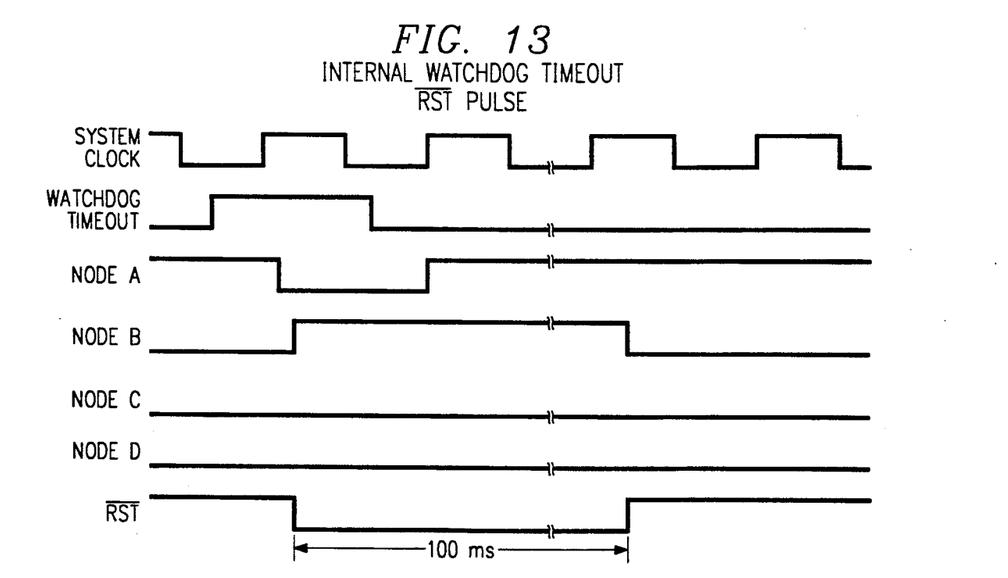
Figure 14:
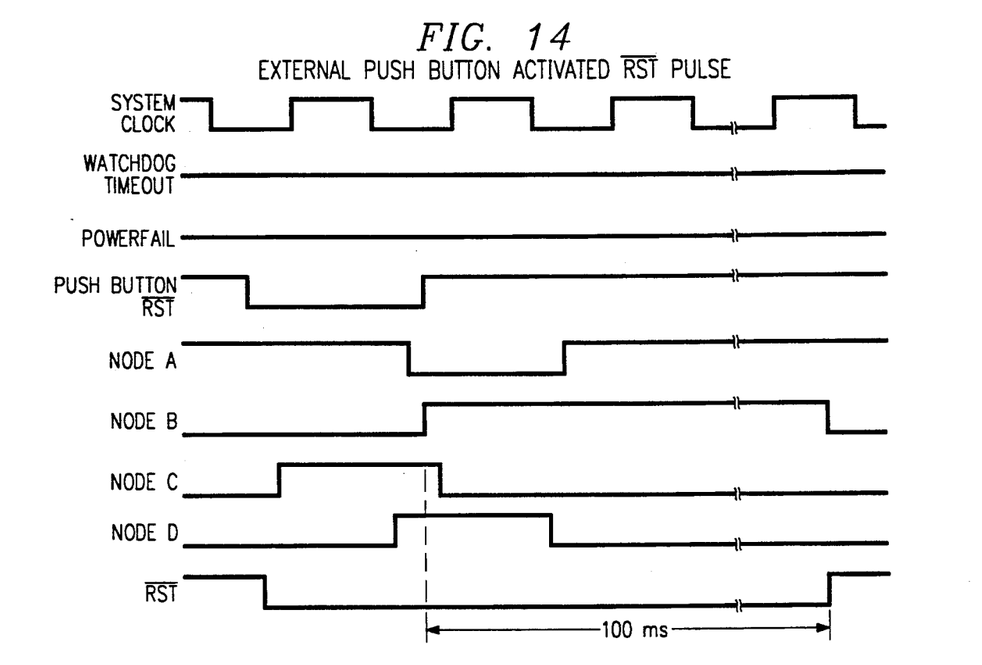

FIGS. 13 and 14 are timing diagrams, referencing the labelled nodes of the circuit of FIG. 12. FIG. 13 illustrates timing relationships when a watchdog timeout generates a reset, and FIG. 14 illustrates timing relationships when a pushbutton input generates a reset.

Alternative Circuit Implementation of Pushbutton Monitor

Figure 15:
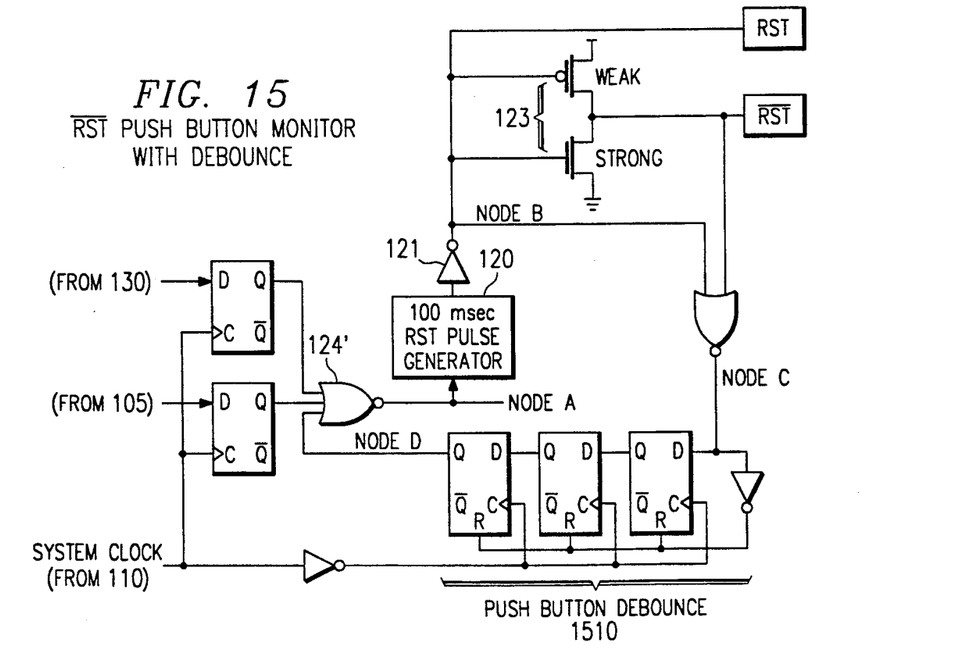
FIG. 15 shows an alternative modification of the circuit of FIG. 12, incorporating addition debounce circuitry.

FIG. 15 shows an alternative modification of the circuit of FIG. 12, incorporating additional debounce circuitry 1510. The additional buffering shown requires that a pushbutton input remain low for three clock cycles before a reset is initiated. Alternatively, the debounce circuitry could comprise a one-shot.

Sample System Configuration

Figure 3:
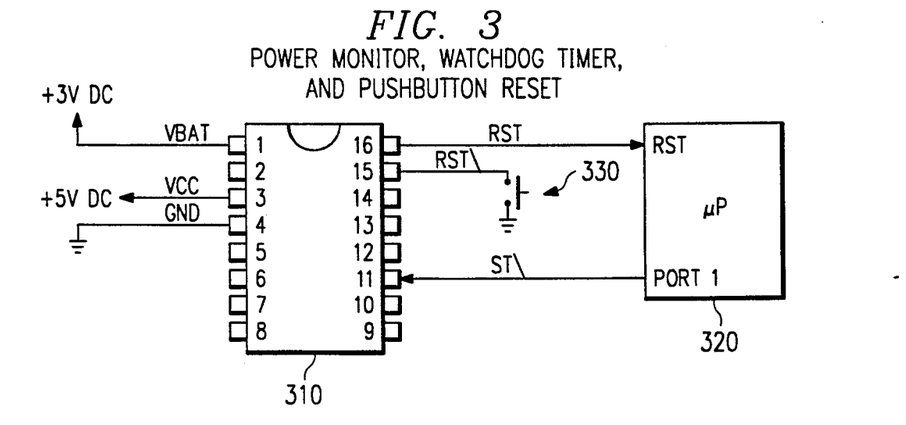
FIG. 3 shows a sample system configuration which includes an auxiliary integrated circuit as in the presently preferred embodiment, together with a pushbutton connected to the active-low reset connection, and an Intel microprocessor connected to the active-high reset connection.
Figure 4:
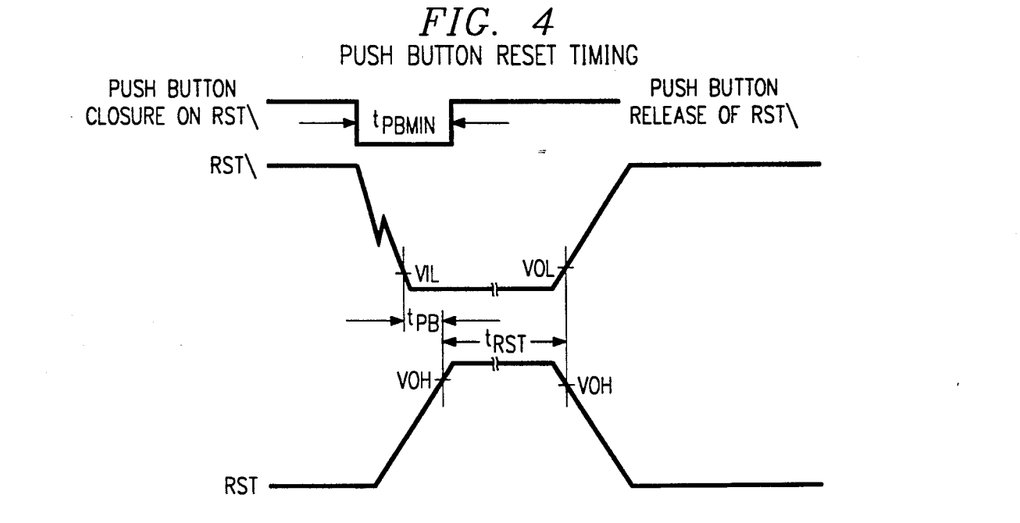
FIG. 4 is a schematic timing diagram showing how pushbutton closure relates to the waveforms on pins RST and RST \, in the auxiliary integrated circuit as in the presently preferred embodiment.

FIG. 3 shows a sample system configuration which includes a "DS1238" auxiliary integrated circuit 310, as described above, together with a pushbutton 330 connected to the active-low reset line RST\, and an Intel microprocessor 320 connected to the active-high reset connection RST. In this example, the microprocessor is an 8051, but of course a wide variety of other types could be used instead.

FIG. 7 shows another sample system configuration which includes a "DS1238" auxiliary integrated circuit 310, as described above, together with a conventional SRAM 710 and a 3 V battery 720. In the preferred embodiments described, the system power supply voltage is +5 V and the battery voltage is approximately +3 V; but of course other voltages could be used instead. Note that this configuration can be combined with that shown in FIG. 3, if desired.

FIG. 9 shows another sample system configuration which includes a switching integrated circuit 910. This configuration too can be combined with the configurations of FIG. 3 and/or FIG. 7, if desired.

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

As will be recognized by those skilled in the art, the innovative concepts described in the present application can be modified and varied over a tremendous range of applications, and accordingly their scope is not limited except by the allowed claims.

What is claimed is:

1. An integrated circuit, for performing power management functions, comprising:
    a voltage comparison circuit, connected to monitor the voltage of an external power supply node with reference to a reference-voltage source;
    a watchdog timer circuit, connected to detect inactivity of more than a minimum duration on a predetermined input node;
    reset control logic, connected to reset nodes;
    interrupt generation logic, connected to an interrupt node;
    and wherein said reset nodes include both an active-high reset node and an active-low reset node;
    and further comprising a debounce circuit connected to said active-low reset node;
    wherein when said watchdog timer circuit detects inactivity of more than a minimum duration said reset control logic generates a low pulse at said active-low reset node, and when said debounce circuit detects a low signal at said active-low reset node not generated by said reset control logic, said reset control logic generates a low pulse at said active-low reset node.

2. The integrated circuit of claim 1, wherein said debounce circuit comprises a one-shot.

3. The integrated circuit of claim 1, wherein said voltage comparison circuit comprises multiple comparators.

4. The integrated circuit of claim 1, wherein said reference-voltage source is a bandgap-voltage-reference.

5. The integrated circuit of claim 1, further comprising chip-enable control logic, connected to receive an externally generated chip-enable input signal, and to provide corresponding chip-enable outputs externally only if said comparison circuit indicates that the external power supply voltage is sufficiently near said target voltage.

6. The integrated circuit of claim 1, further comprising sleep control logic, connected to selectably place said auxiliary integrated circuit into a sleep mode by disabling multiple circuits thereof, including said watchdog timer circuit.

7. A system, comprising:
    a complex programmable integrated circuit;
    an auxiliary integrated circuit, which is connected to provide reset and/or interrupt signals to said complex integrated circuit, and which comprises:
        a voltage comparison circuit, connected to monitor the voltage of an external power supply node with reference to a reference-voltage source;
        a watchdog timer circuit, connected to detect inactivity of more than a minimum duration on a predetermined input node;
        reset control logic, connected to reset nodes;
        interrupt generation logic, connected to an interrupt node;
        and wherein said reset nodes include both an active-high reset node and an active-low reset node;
        and further comprising a debounce circuit connected to said active-low reset node;
        wherein when said watchdog timer circuit detects inactivity of more than a minimum duration said reset control logic generates a low pulse at said active-low reset node, and and
    at least one manually actuable electrical switch, connected to one of said reset nodes of said auxiliary integrated circuit.

8. The system of claim 7, further comprising an input channel, connected to provide data inputs to said complex integrated circuit, and an output channel, connected so that said complex integrated circuit can provide outputs therethrough to one or more storage devices, channel interfaces, processors, and/or users.

9. The system of claim 7, wherein said complex integrated circuit is a microprocessor.

* * * * *